United States Patent
Regikumar et al.

(10) Patent No.: US 11,415,706 B2
(45) Date of Patent: Aug. 16, 2022

(54) METHOD AND SYSTEM FOR ESTIMATING A TRAJECTORY FROM GPS DATA POINTS

(71) Applicant: Tata Consultancy Services Limited, Mumbai (IN)

(72) Inventors: Rohith Regikumar, Chennai (IN); Avinash Achar, Chennai (IN); Rajesh Jayaprakash, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 119 days.

(21) Appl. No.: 17/006,993

(22) Filed: Aug. 31, 2020

(65) Prior Publication Data
US 2021/0165107 A1 Jun. 3, 2021

(30) Foreign Application Priority Data
Nov. 29, 2019 (IN) .............................. 201921049198

(51) Int. Cl.
*G01S 19/39* (2010.01)
*G01S 19/51* (2010.01)

(52) U.S. Cl.
CPC ............ *G01S 19/393* (2019.08); *G01S 19/51* (2013.01)

(58) Field of Classification Search
CPC .............................. G01S 19/393; G01S 19/51
USPC .... 342/357.34, 357.45, 357.25, 357.23, 128, 342/133, 72
See application file for complete search history.

(56) References Cited

U.S. PATENT DOCUMENTS

| | | | | |
|---|---|---|---|---|
| 2013/0046461 A1* | 2/2013 | Balloga | ................. | G01S 7/4972 701/438 |
| 2015/0204973 A1* | 7/2015 | Nohara | ................... | G01S 13/58 342/107 |

FOREIGN PATENT DOCUMENTS

CN 106897394 A 6/2017

OTHER PUBLICATIONS

Ranit Gotsman, "Generating Map-Based Routes From GPS Trajectories and Their Compact Representation", Jan. 2013, *Technion—Israel Institute of Technology*.
Zhangqing Shan et al., "COBWEB: A Robust Map Update System Using GPS Trajectories", *UbiComp '15: Proceedings of the 2015 ACM International Joint Conference on Pervasive and Ubiquitous Computing*, Sep. 2015, pp. 12, School of Information Systems at Institutional Knowledge at Singapore Management University.

(Continued)

*Primary Examiner* — Bo Fan
(74) *Attorney, Agent, or Firm* — Finnegan, Henderson, Farabow, Garrett & Dunner, LLP

(57) ABSTRACT

Accurate estimation of the trajectory of a vehicle by selecting optimal number of GPS data points and a shortest path technique applied for estimation is important and crucial. Method and system for estimating a trajectory from GPS data points is described. The method disclosed utilizes a plurality of GPS data points of a vehicle, an existing road map and a set of equal time intervals obtained by dividing an elapsed time during movement of the vehicle. Each GPS data point is associated to a time interval and a set of candidate points are mapped to each GPS data point correspondingly. A set of possible paths are determined between the set of candidate points in each time interval to estimate the trajectory of the vehicle using one of a shortest path technique and an edit distance technique.

8 Claims, 6 Drawing Sheets

(56) References Cited

OTHER PUBLICATIONS

Bijun Li et al., "A Data Correction Algorithm for Low-Frequency Floating Car Data Sensors", Sep. 25, 2018, vol. issue No. 18(11), 3639, Sensors.

Iq Reviessay Pulshashi et al., "Simplification and Detection of Outlying Trajectories from Batch and Streaming Data Recorded in Harsh Environments", *International Journal of Geo-Information*, Jun. 2019, pp. 25, vol. issue No. 8(6):272, Publisher: Licensee MDPI, Basel, Switzerland.

\* cited by examiner

METHOD AND SYSTEM FOR ESTIMATING A TRAJECTORY FROM GPS DATA POINTS

PRIORITY CLAIM

This U.S. patent application claims priority under 35 U.S.C. § 119 to: Indian application no. 201921049198, filed on Nov. 29, 2019. The entire contents of the aforementioned application are incorporated herein by reference.

TECHNICAL FIELD

The disclosure herein generally relates to Global Positioning System (GPS) data analysis, and, more particularly, to method and system for estimating trajectory of vehicles by analyzing GPS data points of a vehicle.

BACKGROUND

Development in communication technology and device technology has led to a surge in Global Positioning System (GPS) enabled devices. The GPS enabled devices produce large volume of GPS data, which captures and records GPS locations of a subject or object equipped with the GPS device. Huge volume of GPS data stored in databases is further analyzed to derive various insights from the data. For example, GPS data analysis may be performed to estimate trajectories of actual movements of the object or subject form one source to a destination. Typically, when object is a vehicle, the movement of the object or vehicle is along one of the many paths of existing road network. Thus, estimating trajectory herein refers identifying the actual path from the multiple paths that the vehicle must have traversed using the existing road network. With GPS technology, the trajectory is estimated based on GPS data recorded from the GPS device associated with the vehicle. However, in practical scenarios, data collected from the GPS device installed on the vehicle is corrupted due to many practical challenges. This leads to deviation from the actual road and adding a degree of offset to the vehicle's actual position or location. Denoising the collected GPS data to determine actual road track traversed by the vehicle is necessary to estimate an actual or true trajectory of the vehicle from source to destination. The source to destination movement of the vehicle is commonly referred as a trip.

An existing method construct graphs from the GPS data associated with the movement of the vehicle to determine shortest path between the source and the destination, which is an estimate of the trajectory of the vehicle. However, the existing method determines shortest path by considering only the first and last GPS measurements or GPS data corresponding to the source and destination of the trip. Considering only the first and last GPS measurements loses out on crucial intermediate GPS data, leading to considerable error in the estimated the trajectory. Another existing approach considers almost all successive GPS measurements or GPS data points recorded for the trip, where time difference between two GPS data points is barely of few seconds for determining the shortest path. However, too many GPS data points also lead to incorrect results, and error in the estimated trajectory. Further, more are the GPS data points used for estimation of trajectory adds to computation and time required for estimation. The reason being, consideration of all the GPS data points and the shortest paths of their mapped points can often lead to convoluted trajectories. Thus, selecting optimal number of the GPS data points and the shortest distance technique applied for estimation is crucial in accurate estimation of the trajectory.

SUMMARY

Embodiments of the present disclosure present technological improvements as solutions to one or more of the above-mentioned technical problems recognized by the inventors in conventional systems. For example, in one embodiment, a method for estimating a trajectory from Global Positioning System (GPS) data points is provided. The method comprising: receiving a plurality of GPS data points corresponding to a movement of a vehicle from a source to a destination for determining the trajectory of the vehicle. One or more GPS data points from the plurality of GPS data points recorded in a GPS database are deviated from actual GPS location of the vehicle, and each GPS data point is three tuples data comprising a latitude value for a GPS measurement, a longitudinal value for the GPS measurement and a timestamp value at which the GPS measurement is recorded and an existing road map comprising a plurality of road segments of an area covering the source and the destination, wherein each road segment among the plurality of road segments is identified with a unique segment identifier. Further, the method comprising, obtaining an elapsed time during the movement of the vehicle from the source to the destination based on the time stamp of a source GPS data point associated with the source and a destination GPS data point associated with the destination; dividing the elapsed time into a set of equal time intervals. Further, the method comprising, utilizing the received plurality of GPS data points, the existing road map and the set of equal time intervals to: associate each GPS data point to a time interval among the set of equal time intervals based on the timestamp value of each GPS data point to obtain a set of GPS data points corresponding with the time interval; and map a set of candidate points corresponding to each GPS data point from the received plurality of GPS data points, wherein the set of candidate points lie on a set of neighborhood road segments of each GPS data point, and wherein the neighborhood road segments are among the plurality of road segments. Further, the method comprising, determining a set of possible paths between candidate points associated with a start GPS data point and an end GPS data point of each time interval among the set of equal time intervals to generate a plurality of set of possible paths corresponding to each time interval. Further, the method comprising, estimating the trajectory of the vehicle by utilizing one of a shortest path technique and an edit distance technique, wherein, estimating the trajectory by utilizing the shortest path technique comprises: determining a shortest path from the set of possible paths corresponding to each time interval, wherein the shortest path has maximum number of mapped candidate points from the candidate points associated with each GPS data point of each time interval; and estimating the trajectory by concatenating all the determined shortest paths of each time interval. Further, the method comprising, estimating the trajectory by utilizing the edit distance technique comprises: creating a template for each time interval among the plurality of equal time intervals by selecting candidate points that forms a shortest path between two successive GPS points in each time interval; determining an edit distance score between the created template for each time interval among the plurality of equal time intervals and the determined shortest path for each time interval; and estimating the trajectory by concatenating all the paths in each time interval with lowest edit distance score.

In another aspect, a system for estimating a trajectory from Global Positioning System (GPS) data points is provided. The system comprising: one or more data storage devices operatively coupled to one or more processors and configured to store instructions configured for execution by the one or more processors to receive a plurality of GPS data points corresponding to a movement of a vehicle from a source to a destination for determining the trajectory of the vehicle. One or more GPS data points from the plurality of GPS data points recorded in a GPS database are deviated from actual GPS location of the vehicle, and wherein each GPS data point is three tuples data comprising a latitude value for a GPS measurement, a longitudinal value for the GPS measurement and a timestamp value at which the GPS measurement is recorded; and an existing road map comprising a plurality of road segments of an area covering the source and the destination, wherein each road segment among the plurality of road segments is identified with a unique segment identifier. Further, the one or more hardware processors are configured, for the received plurality of GPS data points and the existing road map the computer device performs following steps comprising: obtaining an elapsed time during the movement of the vehicle from the source to the destination based on the time stamp of a source GPS data point associated with the source and a destination GPS data point associated with the destination; dividing the elapsed time into a set of equal time intervals. Further, the one or more hardware processors are configured to utilize the received plurality of GPS data points, the existing road map and the set of equal time intervals to: associate each GPS data point to a time interval among the set of equal time intervals based on the timestamp value of each GPS data point to obtain a set of GPS data points corresponding with the time interval; and map a set of candidate points corresponding to each GPS data point from the received plurality of GPS data points, wherein the set of candidate points lie on a set of neighborhood road segments of each GPS data point, and wherein the neighborhood road segments are among the plurality of road segments. Further, the one or more hardware processors are configured to determine a set of possible paths between candidate points associated with a start GPS data point and an end GPS data point of each time interval among the set of equal time intervals to generate a plurality of set of possible paths corresponding to each time interval. Further, the one or more hardware processors are configured to estimate the trajectory of the vehicle by utilizing one of a shortest path technique and an edit distance technique, wherein, estimating the trajectory by utilizing the shortest path technique comprises: determining a shortest path from the set of possible paths corresponding to each time interval, wherein the shortest path has maximum number of mapped candidate points from the candidate points associated with each GPS data point of each time interval; and estimating the trajectory by concatenating all the determined shortest paths of each time interval. Further, the one or more hardware processors are configured to estimate the trajectory by utilizing the edit distance technique comprises: creating a template for each time interval among the plurality of equal time intervals by selecting candidate points that forms a shortest path between two successive GPS points in each time interval; determining an edit distance score between the created template for each time interval among the plurality of equal time intervals and the determined shortest path for each time interval; and estimating the trajectory by concatenating all the paths in each time interval with lowest edit distance score.

In yet another aspect, there are provided one or more non-transitory machine readable information storage mediums comprising one or more instructions, which when executed by one or more hardware processors causes a method for estimating the trajectory from GPS data points. The method comprising receiving a plurality of GPS data points corresponding to a movement of a vehicle from a source to a destination for determining the trajectory of the vehicle, wherein one or more GPS data points from the plurality of GPS data points recorded in a GPS database are deviated from actual GPS location of the vehicle, and wherein each GPS data point is three tuples data comprising a latitude value for a GPS measurement, a longitudinal value for the GPS measurement and a timestamp value at which the GPS measurement is recorded and an existing road map comprising a plurality of road segments of an area covering the source and the destination, wherein each road segment among the plurality of road segments is identified with a unique segment identifier. Further, the method comprising obtaining, via the one or more hardware processors an elapsed time during the movement of the vehicle from the source to the destination based on the time stamp of a source GPS data point associated with the source and a destination GPS data point associated with the destination; divides the elapsed time into a set of equal time intervals. Further, the method comprising utilizing, via the one or more hardware processors the received plurality of GPS data points, the existing road map and the set of equal time intervals to: associate each GPS data point to a time interval among the set of equal time intervals based on the timestamp value of each GPS data point to obtain a set of GPS data points corresponding with the time interval; and map a set of candidate points corresponding to each GPS data point from the received plurality of GPS data points, wherein the set of candidate points lie on a set of neighborhood road segments of each GPS data point, and wherein the neighborhood road segments are among the plurality of road segments. Further, the method comprising determining, via the one or more hardware processors a set of possible paths between candidate points associated with a start GPS data point and an end GPS data point of each time interval among the set of equal time intervals to generate a plurality of set of possible paths corresponding to each time interval. Further, the method comprising estimating, via the one or more hardware processors the trajectory of the vehicle by utilizing one of a shortest path technique and an edit distance technique, wherein, estimating the trajectory by utilizing the shortest path technique comprises: determining a shortest path from the set of possible paths corresponding to each time interval, wherein the shortest path has maximum number of mapped candidate points from the candidate points associated with each GPS data point of each time interval; and estimating the trajectory by concatenating all the determined shortest paths of each time interval. Further, the method comprising estimating, via the one or more hardware processors the trajectory by utilizing the edit distance technique comprises: creating a template for each time interval among the plurality of equal time intervals by selecting candidate points that forms a shortest path between two successive GPS points in each time interval; determining an edit distance score between the created template for each time interval among the plurality of equal time intervals and the determined shortest path for each time interval; and estimating the trajectory by concatenating all the paths in each time interval with lowest edit distance score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
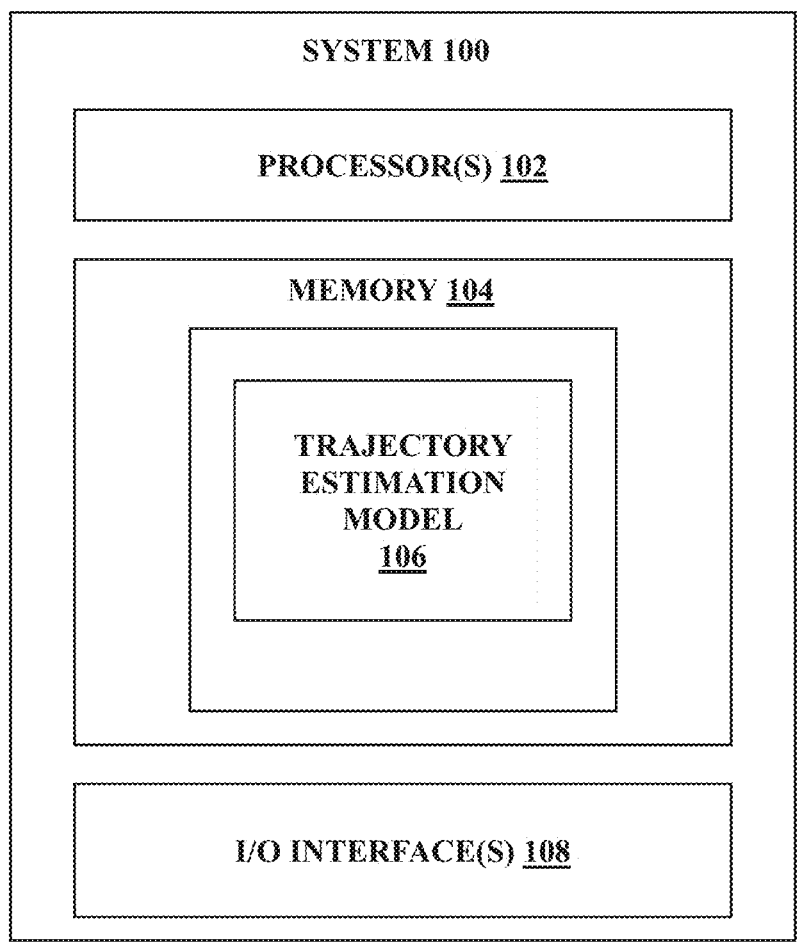
FIG. 1 illustrates a system for estimating a trajectory from Global Positioning System (GPS) data points, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a method and system for estimating a trajectory from Global Positioning System (GPS) data points. The method disclosed provides higher accuracy in estimation of the trajectory of a vehicle by selecting optimal number of GPS data points and a shortest path technique applied for the estimation. The optimal number of data points, referred herein after as a plurality of GPS data points selected using one or more GPS data points corresponding to a set of equal time intervals, wherein the set of equal time intervals is obtained by dividing an elapsed time during a movement of the vehicle from a source to a destination. Each GPS data point is associated to a time interval and a set of candidate points lying on one or more segments of an existing road map. A set of possible paths are determined between the set of candidate points in each time interval to estimate the trajectory of the vehicle using one of a shortest path technique and an edit distance technique. Further, the trajectory of the vehicle is estimated using shortest path technique, by determining a shortest path from the set of possible paths corresponding to each time interval wherein the shortest path has maximum number of mapped candidate points. The trajectory is estimated by concatenating all the determined shortest paths of each time interval. Further, the trajectory of the vehicle is estimated using edit distance technique, by creating a template for each time interval and determining an edit distance score between the created template and the determined shortest path for each time interval. The trajectory is estimated by concatenating all the paths having lowest edit distance score.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

FIG. 1 illustrates a system for estimating the trajectory from the GPS data points, according to some embodiments of the present disclosure. In an embodiment, the system 100 includes one or more processors 102, communication interface device(s) or input/output (I/O) interface(s) 108, and one or more data storage devices or memory 104 operatively coupled to the one or more processors 102. The one or more processors 102, can be one or more hardware processors (102), which can be implemented as one or more microprocessors, microcomputers, microcontrollers, digital signal processors, central processing units, state machines, graphics controllers, logic circuitries, and/or any devices that manipulate signals based on operational instructions. Among other capabilities, the one or more hardware processors (102), are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 108 may include a variety of software and hardware interfaces, for example, a web interface, a Graphical User Interface (GUI), and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server. The I/O interface 108 thus enables connecting to a GPS database comprising a database of GPS data points recorded for a plurality of objects, such as vehicles.

The GPS database comprising the recorded GPS data points of a plurality of objects may be stored in a memory 104. The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a trajectory estimation model 106 of the system 100 along with a plurality of modules (not shown) to perform the methodology described herein for estimating the trajectory from GPS data points. Further, the memory includes a database that may store an existing map, received GPS data points, shortest path techniques models, edit distance technique models and so on.

Figure 2:
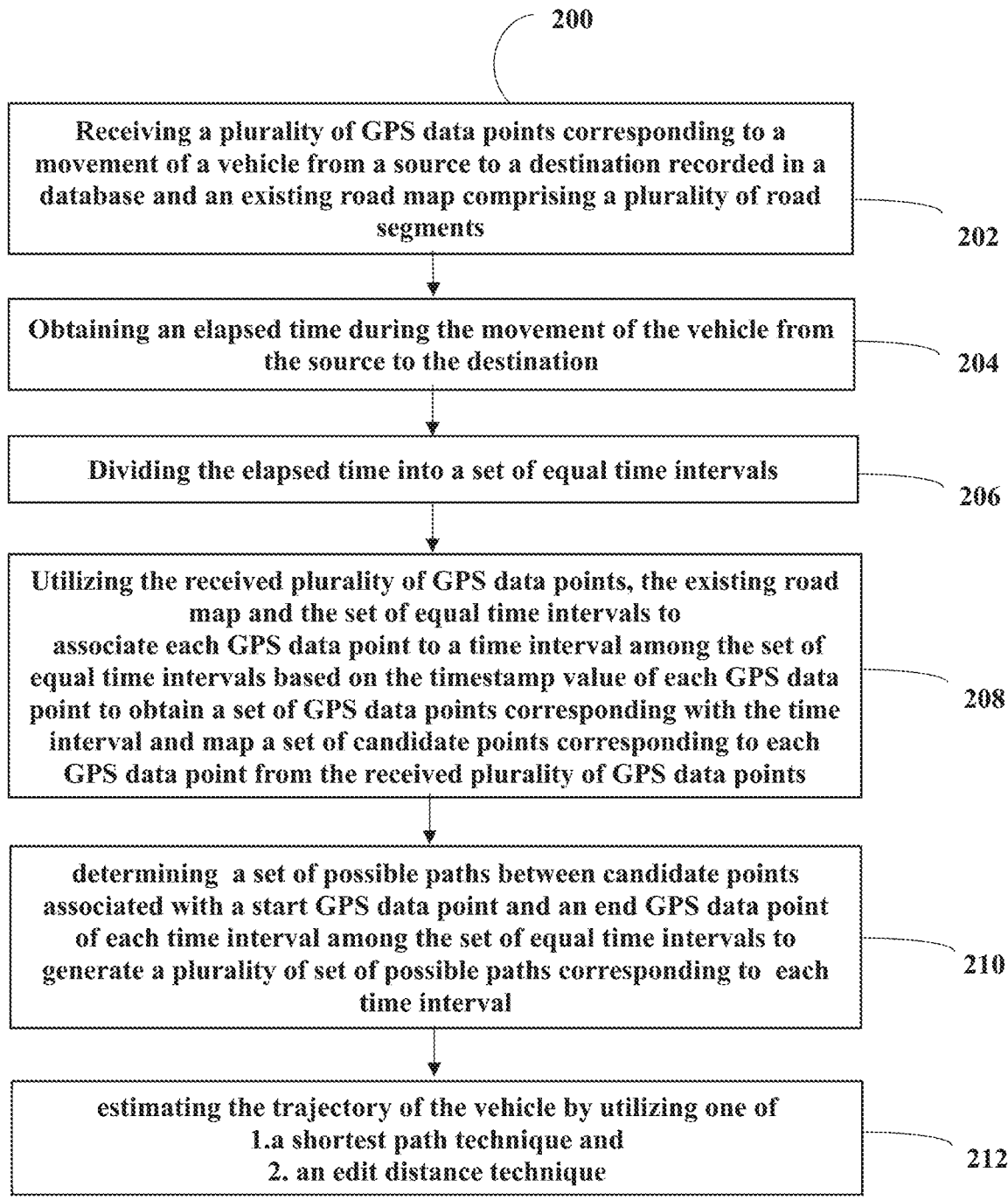
FIG. 2 illustrates an exemplary flow diagram for a processor implemented method for estimating the trajectory from the GPS data points, according to some embodiments of the present disclosure.
Figure 3:
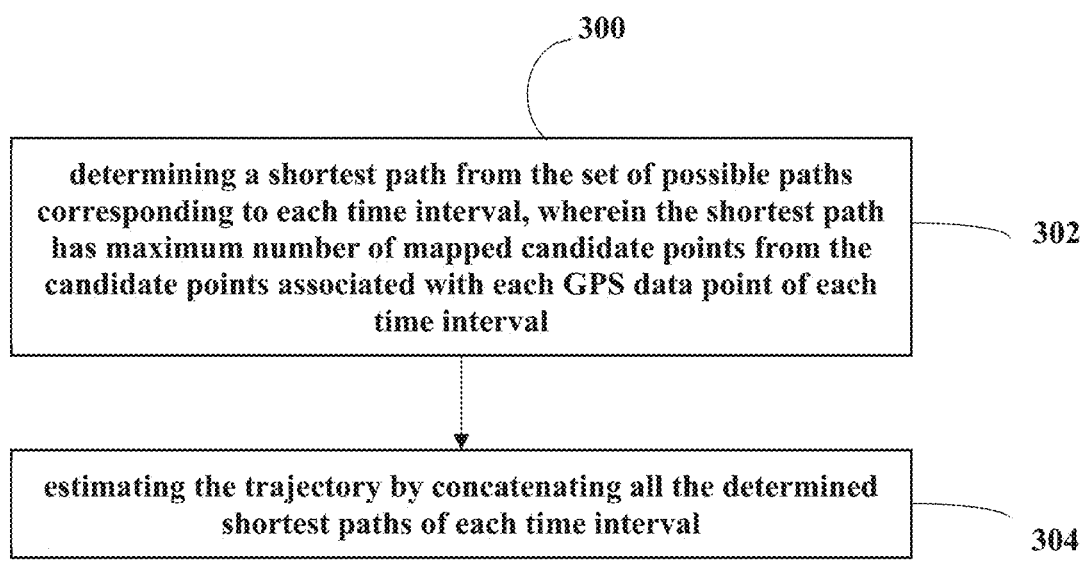
FIG. 3 illustrates an exemplary flow diagram for a processor implemented method for estimating the trajectory from the GPS data points using a shortest path technique, according to some embodiments of the present disclosure
Figure 4:
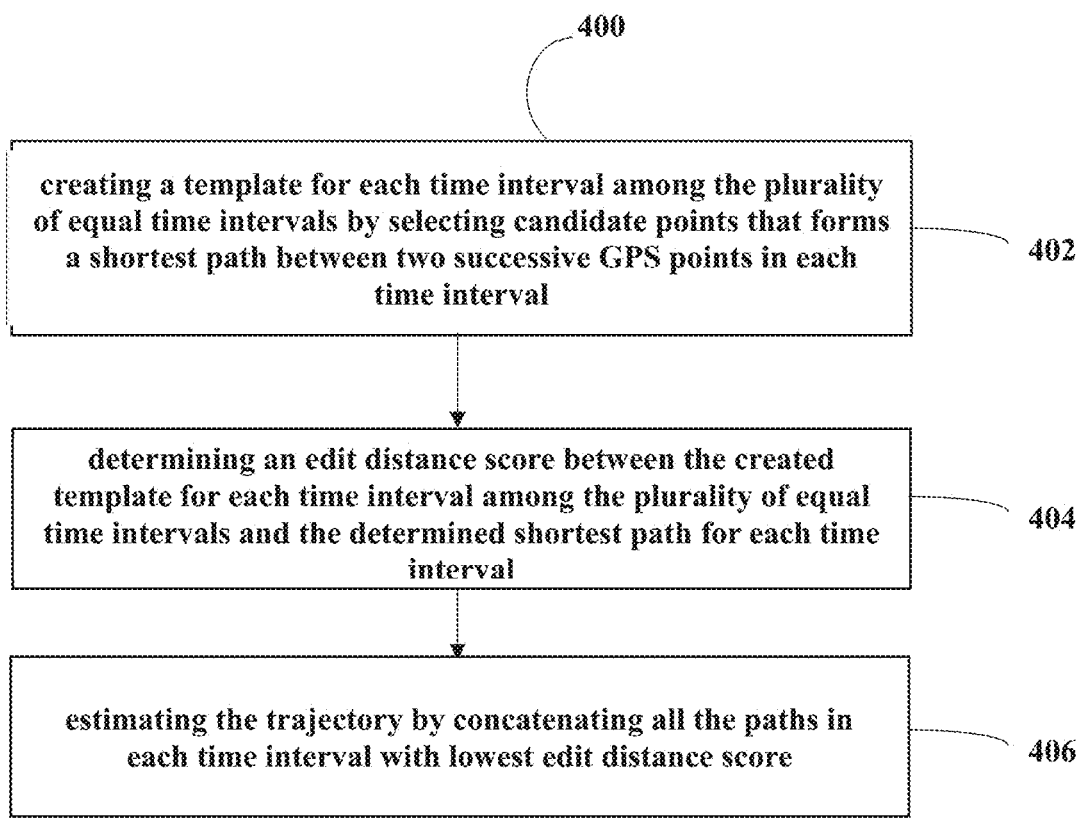
FIG. 4 illustrates an exemplary flow diagram for a processor implemented method for estimating the trajectory from the GPS data points using an edit distance technique, according to some embodiments of the present disclosure FIG. 5A

The functions of trajectory estimation model 106 is further explained in conjunction with FIG. 2, FIG. 3 and FIG. 4.

FIG. 2 illustrates an exemplary flow diagram for a processor implemented method 200 for estimating the trajectory from the GPS data points, according to some embodiments of the present disclosure. In an embodiment, the system 100 comprises one or more data storage devices or the memory 104 operatively coupled to the processor(s) 102, and is configured to store instructions for execution of steps of the method 200 by the processor(s) 102. The steps of the method 200 of the present disclosure will now be explained with reference to the components or blocks of the system 100 as depicted in FIG. 1 and the steps of flow diagram as depicted in FIG. 2 through FIG. 4. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the one or more hardware processors 102 are configured to receive the plurality of GPS data points corresponding to the movement of the vehicle and an existing road map. The movement of the vehicle is from the source to the destination and is recorded in a database in terms of recording of a plurality of GPS data points corresponding to the movement. The movement from source to destination, may alternatively be referred herein as a trip. However, one or more GPS data points from the plurality of GPS data points received may be deviated from an actual GPS location of the vehicle due to practical challenges in recording. Such deviation is termed as noise present tin a GPS data point. Each GPS data point is a three tuple data comprising a latitude value for a GPS measurement, a longitudinal value for the GPS measurement and a timestamp value at which the GPS measurement is recorded. The existing road map comprises a plurality of road segments of an area covering the source and the destination. Each road segment from the plurality of road segments is identified with a unique segment identifier.

At step 204, the one or more hardware processors 102 are configured to obtain an elapsed time during the movement of the vehicle from the source to the destination. The elapsed time is determined based on the time stamp of a source GPS data point associated with the source and a destination GPS data point associated with the destination.

At step 206, the one or more hardware processors 102 are configured to divide the obtained elapsed time into a set of equal time intervals for further estimation of the trajectory of the vehicle. The disclosed method considers the equal time interval in the range of 3 to 10 minutes. Since the GPS measurement is taken at much finer frequency, considering a time interval less than 3 minutes can lead to incorrect estimation of the trajectory. As well, estimating the trajectory considering only the first and last GPS measurements yield to misleading results.

At step 208, the one or more hardware processors 102 are configured to receive plurality of GPS data points, the existing road map and the set of equal time intervals is utilized to associate each GPS data point to a time interval among the set of equal time intervals based on the timestamp value of each GPS data point. Further, a set of GPS data points corresponding with the time interval is obtained. A set of candidate points corresponding to each GPS data point are mapped for further estimating the trajectory of the vehicle.

At step 210, the one or more hardware processors 102 are configured to determine a set of possible paths between candidate points associated with a start GPS data point and an end GPS data point of each time interval among the set of equal time intervals. By considering all the intermediate GPS data points and a set of possible paths associated with their mapped points can often lead to convoluted trajectories. Further, a plurality of set of possible paths corresponding to each time interval are generated. State of the art shortest path technique such as Dijkshtra's shortest path algorithm, Prim's Algorithm and so on are utilized for determining the set of possible paths.

At step 212, the one or more hardware processors 102 are configured to estimate the trajectory of the vehicle by utilizing one of: 1) a shortest path technique and 2) an edit distance technique. The estimation of the trajectory of the vehicle based on shortest path technique is explained in conjunction with the flow diagram depicted in FIG. 3 and the estimation of the trajectory of the vehicle based on edit distance technique is explained in conjunction with the flow diagram depicted in FIG. 4.

FIG. 3 illustrates an exemplary flow diagram for a processor implemented method for estimating the trajectory from the GPS data points using the shortest path technique according to some embodiments of the present disclosure.

At step 302 of method 300, the one or more hardware processors 102 are configured to determine a shortest path from the set of possible paths corresponding to each time interval. The determined shortest path has maximum number of mapped candidate points from the candidate points associated with each GPS data point of each time interval.

At step 304, the one or more hardware processors 102 are configured to estimate the trajectory of the vehicle by concatenating all the determined shortest paths of each time interval.

Example process steps for determining the trajectory of the vehicle based on shortest path technique is given below:
  i) Divide the total number of GPS data points into segments of k number of equal time intervals T1, T2, T3 . . . Tk. Each time interval will contain multiple GPS data points in a given time interval.
  ii) For Tj where 1≤j≤k, find the shortest path between all mapped candidate points at the beginning of the Tj to all mapped points at the end of Tj
  iii) Take the shortest of these paths which has the maximum number of mapped candidate points fall.
  iv) The end point for Tj is fixed, this means the start point for Tj+1 has also been fixed.
  v) Repeat steps ii) and iii) till all segments are covered.
  vi) Concatenate all the shortest paths of each segment to estimate the final trajectory of the vehicle FIG. 4 illustrates an exemplary flow diagram for a processor implemented method for estimating the trajectory from the GPS data points using edit distance technique according to some embodiments of the present disclosure. At step 402 of the method 400, the one or more hardware processors 102 are configured to create a template for each time interval among the plurality of equal time intervals by selecting candidate points that forms a shortest path between two successive GPS points in each time interval.

At step 404 of the method 400, the one or more hardware processors 102 are configured to determine an edit distance score between the created template for each time interval among the plurality of equal time intervals and the determined shortest path for each time interval.

At step 406 of the method 400, the one or more hardware processors 102 are configured to estimate the trajectory by concatenating all the paths in each time interval with lowest edit distance score.

Example process steps for determining the trajectory of the vehicle based on edit distance score is given below:
i) Divide the total number of GPS data points into segments of equal time intervals T1, T2, T3 . . . Tk. Each interval will contain multiple GPS data points in a given time interval.
ii) For Tj where $1 \leq j \leq k$, find the shortest path between all mapped points at the beginning of the Tj to all mapped points at the end of Tj.
iii) Utilizing all the GPS data points in the time interval Tj create a template selecting the candidate points that forms the shortest path between 2 successive GPS data points.
iv) Run an edit distance between the created template, which is a list of paths from start point to end point of GPS data points in the time interval Tj, and the shortest paths obtained at step ii).
v) Select the path with lowest edit distance score
vi) The end point for Tj is fixed, this means the start point for Tj+1 has also been fixed.
vii) Repeat steps ii), iii), iv) and v) till all segments are covered.
viii) Concatenate all the paths with lowest edit distance of each segment to estimate the final trajectory.

Figure 5A:
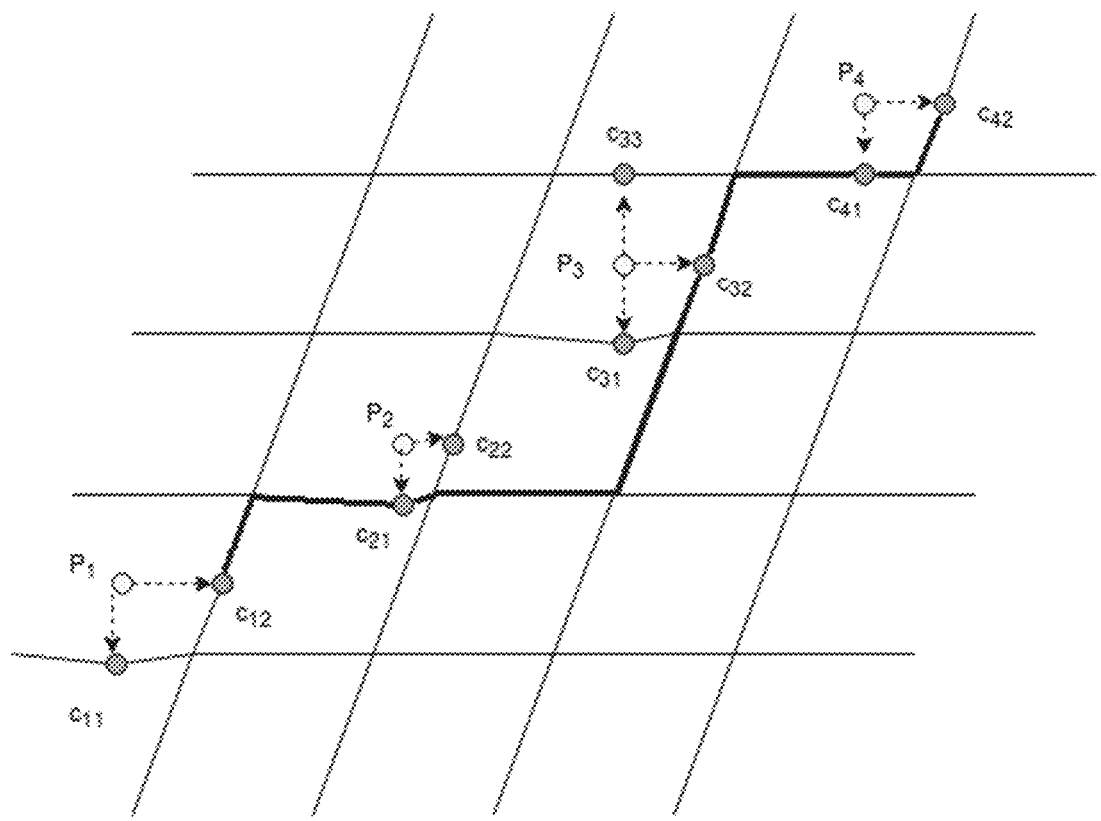
FIG. 5B is an example plot showing an existing road map with the GPS data points along with a shortest path calculated for estimating the trajectory from the GPS data points, in accordance with an embodiment of the present disclosure.
Figure 5B:
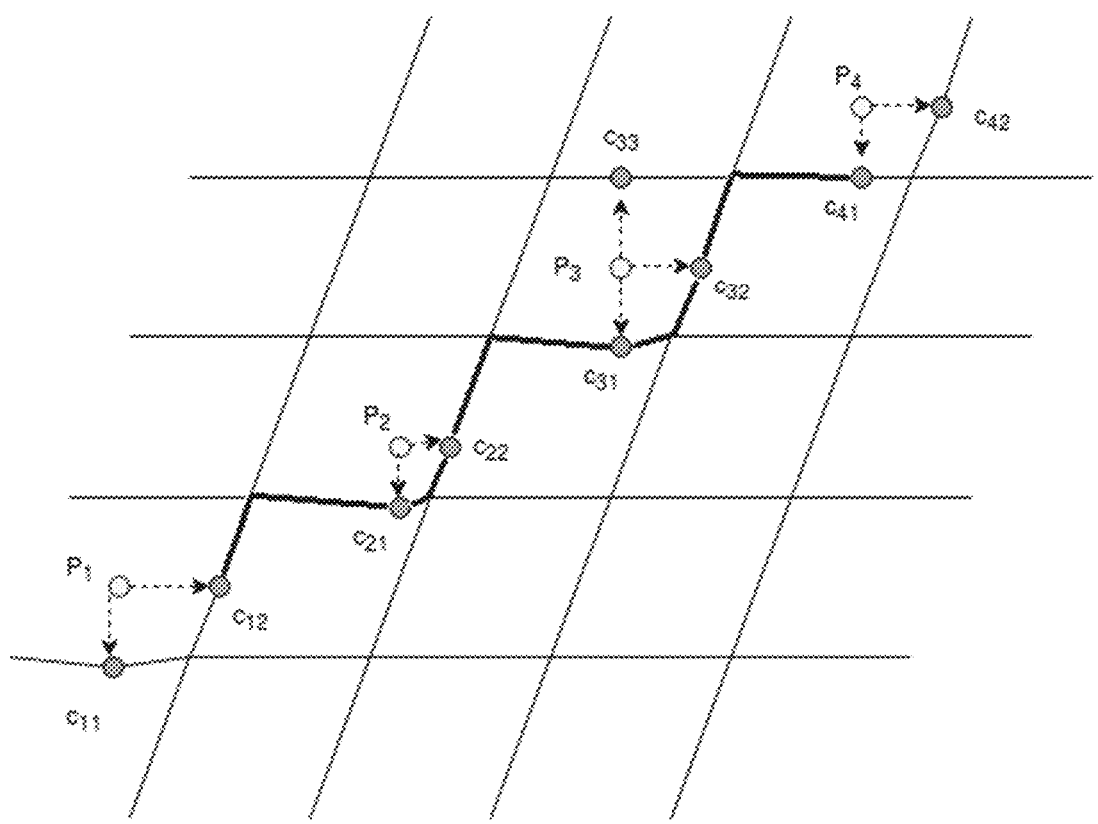

FIG. 5A and FIG. 5B is an example plot showing the existing road map with the GPS data points along with the shortest path calculated for estimating the trajectory from the GPS data points, in accordance with an embodiment of the present disclosure.

Considering FIG. 5A and FIG. 5B, the points P represent the actual GPS measurements received and the points c represent the mapped points from P. FIG. 5A shows the shortest distance between mapped point c12 and c42. FIG. 5A shows the path from P1 to P4 using c12 to c42. The path from P1 to P4 has the least edit distance value with a template formed by concatenating the consecutive shortest of the shortest paths of all mapped points between each of the points P1, P2, P3 and P4. FIG. 5B shows a path formed by choosing from among the shortest paths formed by all mapped points of P1 to all mapped points of P2. The path from P1 to P2 is chosen by finding the path from among the shortest paths which has the maximum number of candidate points.

The embodiments of present disclosure addressed the problem of estimating the trajectory of the vehicle in an efficient and accurate manner compared to existing methods. Since the GPS measurement is taken at much finer frequency, the disclosed method considers segmenting the elapsed time into a time interval in the range of 3 to 10 minutes. Considering a time interval less than 3 minutes can lead to incorrect estimation of the trajectory. The time interval in the range of three to ten minutes provides optimal GPS data points wherein time interval less than three minutes and greater than ten minutes can lead to inaccurate results for estimating the trajectory. The disclosed method determines the shortest path in each time interval for estimating the trajectory of the vehicle in an accurate manner. The disclosed method utilizes shortest path, actual GPS measurements and edit distance technique for estimating the trajectory of the vehicle. Thus the disclosed method provide a higher accuracy in trajectory estimation providing the closest possible actual path traversed by the vehicle, considering the optimal number of GPS points and achieves most accurate trajectory with optimal computation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for estimating a trajectory from Global Positioning System (GPS) data points, the method comprising:
   receiving:
     a plurality of GPS data points corresponding to a movement of a vehicle from a source to a destination for determining the trajectory of the vehicle, wherein one or more GPS data points from the plurality of GPS data points recorded in a GPS database are deviated from actual GPS location of the vehicle, and wherein each GPS data point is a three tuples data comprising a latitude value for a GPS measurement, a longitudinal value for the GPS measurement and a timestamp value at which the GPS measurement is recorded; and
     an existing road map comprising a plurality of road segments of an area covering the source and the destination, wherein each road segment among the plurality of road segments is identified with a unique segment identifier;
   obtaining an elapsed time during the movement of the vehicle from the source to the destination based on the time stamp of a source GPS data point associated with the source and a destination GPS data point associated with the destination;
   dividing the elapsed time into a set of equal time intervals, wherein the time interval ranges between three to ten minutes to avoid inaccurate results for estimating the trajectory if chosen less than three minutes and greater than ten minutes, and achieves accuracy by selecting optimal number of GPS data points selected using the one or more GPS points corresponding to the set of equal time intervals;
   utilizing the received plurality of GPS data points, the existing road map and the set of equal time intervals to:
     associate each GPS data point to a time interval among the set of equal time intervals based on the timestamp value of each GPS data point to obtain a set of GPS data points corresponding to the time interval; and
     map a set of candidate points corresponding to each GPS data point from the received plurality of GPS data points, wherein the set of candidate points lie on a set of neighbourhood road segments of each GPS data point, and wherein the set of neighbourhood road segments are among the plurality of road segments;
   determining a set of possible paths between candidate points associated with a start GPS data point and an end GPS data point of each time interval among the set of equal time intervals to generate a plurality of set of possible paths corresponding to each time interval; and
   estimating the trajectory of the vehicle by utilizing one of a shortest path technique and an edit distance technique, wherein, estimating the trajectory by utilizing the shortest path technique comprises:
     determining a shortest path from the set of possible paths corresponding to each time interval, wherein the shortest path has maximum number of mapped candidate points from the candidate points associated with each GPS data point of each time interval; and
     estimating the trajectory by concatenating all the determined shortest paths of each time interval.

2. The method of claim 1, wherein estimating the trajectory by utilizing the edit distance technique comprises:
   creating a template for each time interval among the plurality of equal time intervals by selecting candidate points that forms a shortest path between two successive GPS points in each time interval;
   determining an edit distance score between the created template for each time interval among the plurality of equal time intervals and the determined shortest path for each time interval; and
   estimating the trajectory by concatenating all the paths in each time interval with lowest edit distance score.

3. The method of claim 1, wherein the mapped set of candidate points for each noisy GPS data point are determined by closest points on the road segments of the existing road map within a fixed distance from the GPS data point.

4. A system for estimating a trajectory from GPS data points, the system comprising:
   a memory storing instructions;
   one or more Input/Output (I/O) interfaces; and
   one or more hardware processors coupled to the memory via the one or more I/O interfaces, wherein the one or more hardware processors are configured by the instructions to:
   receive:
     a plurality of GPS data points corresponding to a movement of a vehicle from a source to a destination for determining the trajectory of the vehicle, wherein one or more GPS data points from the plurality of GPS data points recorded in a GPS database are deviated from actual GPS location of the vehicle, and wherein each GPS data point is a three tuples data comprising a latitude value for a GPS measurement, a longitudinal value for the GPS measurement and a timestamp value at which the GPS measurement is recorded; and
     an existing road map comprising a plurality of road segments of an area covering the source and the destination, wherein each road segment among the plurality of road segments is identified with a unique segment identifier;
   obtain an elapsed time during the movement of the vehicle from the source to the destination based on the time stamp of a source GPS data point associated with the source and a destination GPS data point associated with the destination;

divide the elapsed time into a set of equal time intervals, wherein the time interval ranges between three to ten minutes to avoid inaccurate results for estimating the trajectory if chosen less than three minutes and greater than ten minutes, and achieves accuracy by selecting optimal number of GPS data points selected using the one or more GPS points corresponding to the set of equal time intervals;

utilize the received plurality of GPS data points, the existing road map and the set of equal time intervals to:
associate each GPS data point to a time interval among the set of equal time intervals based on the timestamp value of each GPS data point to obtain a set of GPS data points corresponding with the time interval; and map a set of candidate points corresponding to each GPS data point from the received plurality of GPS data points, wherein the set of candidate points lie on a set of neighbourhood road segments of each GPS data point, and wherein the neighbourhood road segments are among the plurality of road segments;

determine a set of possible paths between candidate points associated with a start GPS data point and an end GPS data point of each time interval among the set of equal time intervals to generate a plurality of set of possible paths corresponding to each time interval; and estimate the trajectory of the vehicle by utilizing one of a shortest path technique and an edit distance technique, wherein, estimating the trajectory by utilizing the shortest path technique comprises:
determining a shortest path from the set of possible paths corresponding to each time interval, wherein the shortest path has maximum number of mapped candidate points from the candidate points associated with each GPS data point of each time interval; and estimating the trajectory by concatenating all the determined shortest paths of each time interval.

5. The system of claim 4, wherein the mapped set of candidate points for each noisy GPS data point are determined by closest points on the road segments of the existing road map within a fixed distance from the GPS data point.

6. One or more non-transitory machine readable information storage mediums comprising one or more instructions, which when executed by one or more hardware processors causes a method for:
receiving:
a plurality of GPS data points corresponding to a movement of a vehicle from a source to a destination for determining the trajectory of the vehicle, wherein one or more GPS data points from the plurality of GPS data points recorded in a GPS database are deviated from actual GPS location of the vehicle, and wherein each GPS data point is a three tuples data comprising a latitude value for a GPS measurement, a longitudinal value for the GPS measurement and a timestamp value at which the GPS measurement is recorded; and an existing road map comprising a plurality of road segments of an area covering the source and the destination, wherein each road segment among the plurality of road segments is identified with a unique segment identifier;

obtaining an elapsed time during the movement of the vehicle from the source to the destination based on the time stamp of a source GPS data point associated with the source and a destination GPS data point associated with the destination;

dividing the elapsed time into a set of equal time intervals, wherein the time interval ranges between three to ten minutes to avoid inaccurate results for estimating the trajectory if chosen less than three minutes and greater than ten minutes, and achieves accuracy by selecting optimal number of GPS data points selected using the one or more GPS points corresponding to the set of equal time intervals;

utilizing the received plurality of GPS data points, the existing road map and the set of equal time intervals to:
associate each GPS data point to a time interval among the set of equal time intervals based on the timestamp value of each GPS data point to obtain a set of GPS data points corresponding to the time interval; and map a set of candidate points corresponding to each GPS data point from the received plurality of GPS data points, wherein the set of candidate points lie on a set of neighbourhood road segments of each GPS data point, and wherein the set of neighbourhood road segments are among the plurality of road segments;

determining a set of possible paths between candidate points associated with a start GPS data point and an end GPS data point of each time interval among the set of equal time intervals to generate a plurality of set of possible paths corresponding to each time interval; and estimating the trajectory of the vehicle by utilizing one of a shortest path technique and an edit distance technique, wherein, estimating the trajectory by utilizing the shortest path technique comprises:
determining a shortest path from the set of possible paths corresponding to each time interval, wherein the shortest path has maximum number of mapped candidate points from the candidate points associated with each GPS data point of each time interval; and estimating the trajectory by concatenating all the determined shortest paths of each time interval.

7. The one or more non-transitory machine readable information storage mediums of claim 6, wherein estimating the trajectory by utilizing the edit distance technique comprises:
creating a template for each time interval among the plurality of equal time intervals by selecting candidate points that forms a shortest path between two successive GPS points in each time interval;
determining an edit distance score between the created template for each time interval among the plurality of equal time intervals and the determined shortest path for each time interval; and
estimating the trajectory by concatenating all the paths in each time interval with lowest edit distance score.

8. The one or more non-transitory machine readable information storage mediums of claim 6, wherein the mapped set of candidate points for each noisy GPS data point are determined by closest points on the road segments of the existing road map within a fixed distance from the GPS data point.

* * * * *